May 22, 1956  A. B. SKROMME  2,746,584
SAFETY CONTROL FOR SELF-INTERRUPTING CLUTCH
Filed April 2, 1953  2 Sheets-Sheet 1
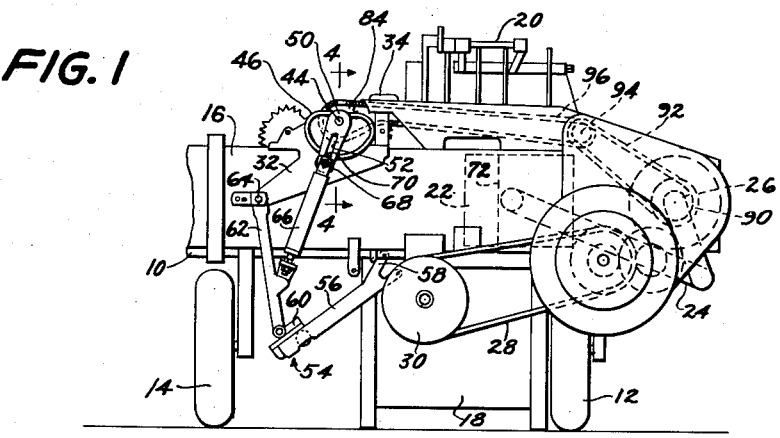
INVENTOR.
A. B. SKROMME
ATTORNEYS May 22, 1956     A. B. SKROMME     2,746,584
SAFETY CONTROL FOR SELF-INTERRUPTING CLUTCH
Filed April 2, 1953     2 Sheets-Sheet 2
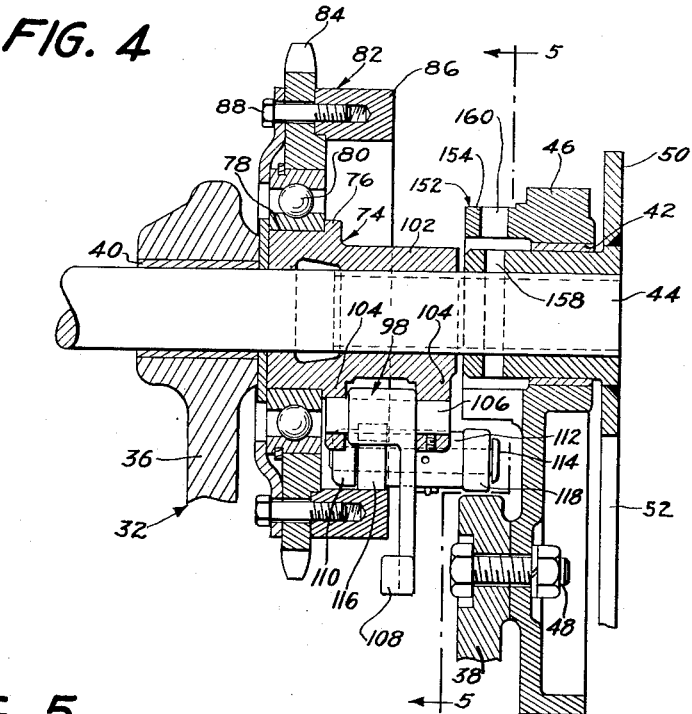
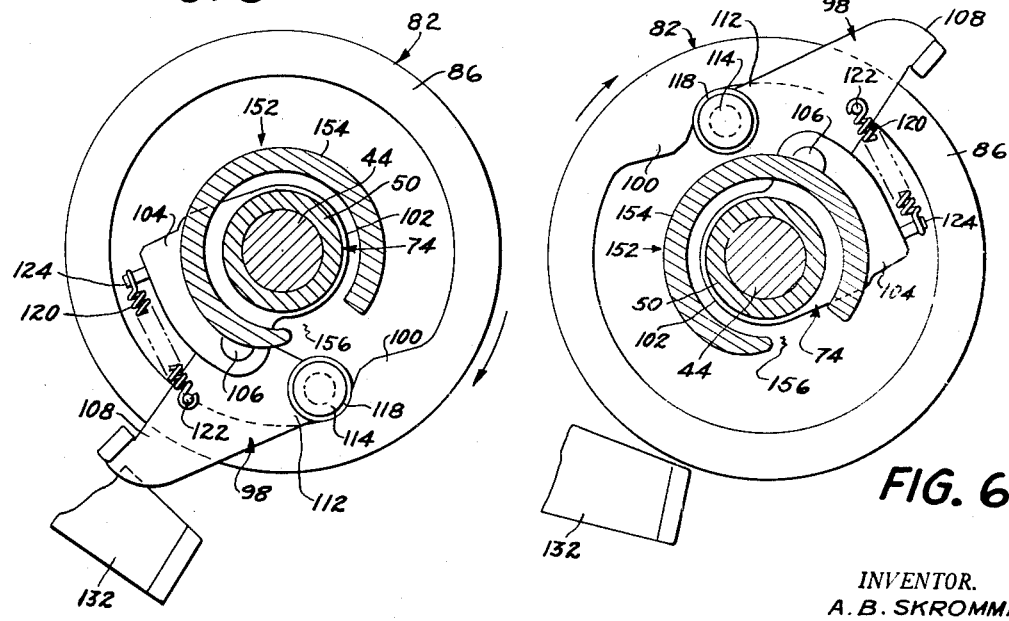
INVENTOR.
A. B. SKROMME
ATTORNEYS

United States Patent Office 2,746,584
Patented May 22, 1956

2,746,584
SAFETY CONTROL FOR SELF-INTERRUPTING CLUTCH

Arnold B. Skromme, Ottumwa, Iowa, assignor to Deere Manufacturing Co., Dubuque, Iowa, a corporation of Iowa Application April 2, 1953, Serial No. 346,403

2 Claims. (Cl. 192—28)

This invention relates to a safety control for a self-interrupting clutch and more particularly to a clutch of such character for use in agricultural balers of the type employed in the baling of hay, straw, etc.

A typical baler of the character mentioned will include a mobile frame on which is mounted a bale case. Pick-up mechanism ahead of the bale case picks up hay or straw from the field or from a pile and moves it into the bale case in the path of a reciprocating plunger. Successive charges of hay or straw are compressed by the plunger into the accumulating bale and when the bale case attains a predetermined length, suitable mechanism is operative to actuate tying mechanism for tying the bale, after which the tied bale is discharged to be later picked up and stored. In many well known types of balers, the tying mechanism includes a needle that moves from one side of the bale case to the other to bring a tying medium—such as wire or twine—across to knotting or tying means, and the apparatus is so designed that the needle is normally idle until the bale has attained its completed form, following which the needle moves across the bale case to cooperate with the tying means. In order that the intermittent passage of the needle across the bale case may be accommodated by the plunger, the leading face of the plunger has slots therein, and the timing is such that the needle passes through the slots in its travel across the bale case just as the plunger is receding. From this, it will be obvious that if for any reason the needles are stopped part way across the bale case, they will be in a position to be damaged by the plunger on its next stroke, since at that time the plunger will be carrying a charge of hay and the needle-accommodating slots will be covered.

There are various and not infrequent causes for needle stoppage. For example, the drive to the needle may be accidentally interrupted by inadvertent disconnection of the needle-drive clutch during an intermediate phase of the needle stroke. It is with this latter type of problem that the present invention is concerned.

Simplicity and economy in structure and function have fairly well dictated the use of the so-called self-interrupting clutch in the power train for the needle. In a power train of this type, a constantly running power input member drives a constantly running or driving clutch member. An intermittently running or driven clutch member is normally idle and is journaled coaxially with the driving member. The driven member is connected by a pitman or the like to the needles and the needles are normally idle as the bale is being accumulated. A clutch of this character will include a clutch dog carried by the driven member and biased for engagement with the driving member, but the clutch is held out of engagement with the driving member by an appropriate tripping mechanism responsive to the completion of the bale, in which event, the trip is moved and the clutch dog is released for driving engagement between the two clutch members to establish rotation of these two clutch members in unison for one revolution. The trip member is immediately returned to its former position so that upon the completion of the one revolution of the clutch members in unison, the clutch dog is again engaged by the trip member and is disengaged from the driving member. During the one revolution of the clutch members in unison, the needle travels across the bale case and returns.

Heretofore, the bias of the clutch dog to engaged position was the only means for maintaining engagement of the clutch dog with the driving member, from which it will be seen that accidental disengagement of the clutch dog would mean that the drive to the needles would be disconnected at some intermediate point, which would mean that the needles might very well be caused to halt part way across the bale chamber, in which position they would be subject to damage by the oncoming and charged plunger. According to the present invention this defect is overcome by the provision of safety control means for positively blocking disengagement of the clutch dog until substantially one complete revolution of the clutch members in unison has been accomplished. It is an important object of the invention to provide a design of safety control means of such nature that it may be readily incorporated into existing clutch designs without material alteration of the fundamentals of structure and operation.

In its most specific form, the invention has for a further important object the utilization of a substantially circular or arcuate guide or track means for blocking escape of the clutch dog from its engagement with the driving member, the track or guide means having, however, a recess or pocket means for accommodating movement of the clutch dog from its driving to a disengaged or retracted position.

The foregoing and other important objects and desirable features inherent in and encompassed by the invention will become apparent as a preferred embodiment of the invention is disclosed in the following specification and accompanying sheets of drawings in which—

Fig. 1 is a rear elevational view of a typical baler.

Fig. 2 is a fragmentary view, on an enlarged scale and partly in section, of the clutch and the actuating means therefor.

Fig. 3 is a sectional view as seen substantially along the line 3—3 of Fig. 2.

Fig. 4 is an enlarged cross sectional view as seen along the line 4—4 of Fig. 1.

Fig. 5 is an enlarged view, somewhat schematic and partly in section, as seen primarily along the line 5—5 of Fig. 4 and showing the condition of the clutch shortly after the clutch dog has been released by the trip means for engagement with the driving member.

Fig. 6 is a view similar to Fig. 5 but showing the condition of the clutch after substantially one-half revolution thereof and illustrating the means for preventing disengagement of the clutch dog from the driving member.

The baler chosen for the purposes of illustration and description is, in its over-all aspects, possessed of conventional structural and functional characteristics, representative of which is the disclosure in the U. S. patent to McClellan et al. 2,621,588. Familiarity with that patent and with the conventional designs of balers will be assumed; accordingly, the present basic description will be somewhat general.

The baler shown here comprises a main frame 10 carried on right- and left-hand ground wheels 12 and 14 and including a transverse bale case 16 to which material picked up from the field is fed by a conventional pick-up means 18 and overhead feeder means 20. A plunger 22 reciprocates lengthwise of the bale case and is driven by a pitman 24 connected to a crankshaft 26. The crankshaft is driven by appropriate gearing deriving power in the first instance by means of a belt 28 trained about a sheave 30 on a shaft driven from the power take-off shaft (not shown) of a tractor (also not shown) conventionally used to tow the baler over a field.

An intermediate portion of the bale case 16 carries at its upper portion appropriate supporting structure, designated generally by the numeral 32, which supports tying mechanism 34, as well as other components not material here. The supporting structure 32 contributes nothing specifically to the present invention, except to provide means for supporting mechanism to be presently described. The supporting structure as such forms the subject matter of the U. S. patent to Hill 2,558,250.

The tying means 34 is of the wire-tying type, such as that forming the subject matter of the U. S. patent to Tuft 2,512,754. The details are not important here, except as a broad element in the combination of which the improvement does form a material part.

As best shown in Fig. 4, the supporting structure 32 has a pair of upstanding portions 36 and 38 spaced apart transversely across the length of the bale case 16. These portions serve to carry bearings 40 and 42 for journaling a transverse shaft 44. The bearing 42 is carried in a fixed cam 46 which is rigidly secured, as by bolts 48, to the supporting portion 38. The rear end of the shaft (as viewed in Fig. 1) has keyed thereto a needle-lift arm 50 in which is formed a slot 52 extending radially as respects the axis of the shaft 44.

The means for tying bales formed by the baler includes one or more needles 54. For the sake of simplicity, and since the needles are but duplicates of each other, the singular form will be used to a large extent. Each needle comprises a needle shank 56 having a free bifurcated end 58 and having its other end fixedly secured at 60 to a needle arm 62. The upper end of the needle arm is pivoted at 64 to a depending portion of the supporting structure 32. It will be understood that a similar arrangement is present at the front side of the bale case 16. The needle 54 is thus in the form of an L and is movable about the pivot 64 from the position shown in Fig. 1 to a position adjacent the tying means 34 and return. The active and return strokes of the needle are effected by means of a pitman 66 connected between the needle-lift arm 50 and the needle-supporting arm 62. The connection of the pitman 66 to the arm 50 is by means of a pin 68 and a roller 70, the pin 68 passing through the slot 52 in the arm 50 and the roller 68 riding on the track of the cam 46. The purpose of this arrangement is to cause the needle 54 to dwell at the end of its active stroke. For that purpose, the upper portion of the cam is flattened, as will be seen. That is to say, because of the appreciable length of time it takes for the tying mechanism 34 to form the knot in the tying medium, the needle 54, when its bifurcated portion 58 is proximate to the tying means 34, must be held stationary or substantially so. Here again, the particular details are not a material part of the present invention and are illustrated because they are part of the baler selected for the purposes of the present disclosure. These details form the subject matter of the U. S. patent to Hill 2,512,896.

The operation of the baler—at least to the extent described—follows the usual pattern. As the baler is drawn over the field, power is supplied to the input shaft 30 which in turn drives the crankshaft 26 to reciprocate the plunger 22. Successive charges of hay are compressed as the plunger 22 extends on successive compression strokes to the left as seen in Fig. 1. When the bale attains a predetermined size, the tying mechanism is activated and the needle 54 moves across to present its bifurcated portion 58 to the tying means 34. One strand of wire or twine will be present in the means 34 and the bifurcated end 58 of the needle 54 will bring a strand of wire or twine up from the bottom. The numeral 72 in Fig. 1 designates a vertical slot through the plunger and opening at the front face of the plunger so that the needle 54 will be accommodated. It is expected that the tying operation will occur during the following retracting stroke of the plunger, whereupon it is important that the needle 54 be returned to its retracted position (Fig. 1) before the next compression stroke of the plunger, since on this compression stroke the plunger will be carrying across its front face a charge of hay which will block the needle-accommodating slot or slots.

During the accumulation of successive charges of hay to form the bale, the shaft 44 is idle. Consequently, the needle 54 remains in its position of Fig. 1 until activated by mechanism to be described immediately below.

The shaft 44 has keyed thereto, intermediate the cam 46 and the supporting structure portion 36, a driven member designated generally by the numeral 74. This member has an annular flange 76 alongside of which is a circumferential shoulder 78 to receive an anti-friction bearing 80. This bearing journals a driving member designated generally by the numeral 82. This member includes a sprocket 84 and a driving ring 86. The ring is secured to the sprocket 84 by a plurality of cap screws 88, so that the two rotate together but relative to the driven member 74. Thus, the members 74 and 82 are coaxially journaled on the supporting structure 32 and at times are rotatable relative to each other and at other times are rotatable in unison. As shown in Fig. 1, the plunger crankshaft 26 has keyed thereto a driving sprocket 90 which transmits power by means of a chain 92 to an intermediate sprocket 94. The sprocket 94 is in turn connected by a chain 96 to the sprocket 84. Thus, the sprocket 84, and consequently the driving member 82, is continuously or constantly driven as long as the plunger crankshaft 26 rotates.

The members 74 and 82, together with a clutch dog 98, make up what is termed a self-interrupting clutch. This clutch is disengaged during formation of the bale, so that the shaft 44 is idle. Since the needle lift arm 50 is keyed to the shaft 44 and since this arm is connected by the pitman 66 to the needle 54, the needle will retain its idle or retracted position of Fig. 1 until the clutch is energized or activated.

As best shown in Figs. 2, 5 and 6, the interior periphery of the driving member ring 86 is substantially circular, except that it is interrupted by driving lug means or a radially inwardly directed hump 100. The driven member 74 has a hub 102 on which are integrally formed a pair of supporting ears 104. These ears are apertured on an axis parallel to the axis of the shaft 44 and receive a pivot or mounting pin 106.

The clutch dog 98 is in the form of a bell crank having a first arm 108 and a second bifurcated arm having furcations 110 and 112 (Fig. 4). These furcations are apertured in alinement on an axis parallel to the axis of the shaft 44 and carry a pin 114. This pin journals a first roller 116 between the furcations 110 and 112 and a second roller 118 laterally outwardly of the furcation 112. The arrangement of the driving and driven members is such that the ring 86 encircles the hub 102 of the driven member 74. Consequently, the roller 116 is within the opposite radial planes of the ring 86 and therefore is in position at times to be engaged by the lug means or hump 100 on the ring. Additionally, the roller 118 is laterally outwardly of the ring 82 and establishes a guide or control element, as will be outlined below. Stated broadly, the rollers 116 and 118 could be a single roller and the specific arrangement could be otherwise than illustrated.

Because of the pivotal mounting at 106, the clutch dog 98 is shiftable between a retracted position, in which the roller 116 is clear of the hump 100, and a driving position in which the roller is engageable by the driving hump. Biasing means in the form of a small tension spring 120 is connected at its opposite ends respectively to anchor pins 122 and 124 fixed respectively to the clutch dog 98 and one of the ears 104 on the driving member hub 102. This spring normally urges the clutch dog 98 to its driving position. That is to say, the action of the spring is such as to pivot the clutch dog 98 in a clockwise direction as seen in Fig. 5, whereupon the roller 116 is urged to a position in which it will be engaged by the hump 100 on the driving ring 86.

However, during the accumulation of the bale and before the completion of the bale, the clutch dog 98 is held in its retracted position by trip means shown best in Figs. 2 and 3. This trip means includes a shaft 126 appropriately journaled in a pair of upstanding brackets 128 rigid on the supporting structure 32. A toothed measuring wheel 130, which may be of conventional design, is keyed to the shaft and is rotated in increments, in the direction of the arrow indicated in Fig. 2, as the bale accumulates and is moved toward the left as seen in Fig. 1.

At the outer or rear end of the shaft 126 is journaled a trip arm 132 biased to the position of Fig. 2 by a tension spring 134. This spring is anchored at one end at 136 to the bale case 16 and is connected at its other end to a depending arm 138 rigid on the trip arm 132. Thus the trip arm 132 is yieldably maintained in a position to engage the arm 108 of the clutch dog 98 so that the clutch dog is maintained in its retracted or disengaged position. Therefore, the sprocket 84 will rotate the driving member 82 without any effect on the driven member 74.

The means by which the arm 132 is rockable on and therefore relative to the measuring wheel shaft 126 includes a journaling sleeve 140 which is connected with one end 142 of a torsion spring 144. This spring surrounds the shaft 126 and has its opposite end extending as a tail 146 engageable by a lug 148 fixed on the shaft 126. As the measuring wheel 130 is rotated by the accumulating bale, the spring 144 is increasingly loaded, but until its maximum torque is developed, it is insufficient to overcome the tension spring 134 that holds the trip arm 132 in its position of Fig. 2. Furthermore, the trip arm 132 is latched, as by latch means 150, against escape from its clutch-dog-engaging position. However, when the torque in the spring 144 is built up, which will occur when the bale has attained its maximum length, on the basis of predetermined calculations, the latch 150 will release and the arm 132 will be swung downwardly and out of engagement with the arm 108 of the clutch dog 98. In this respect, it should be noted that the specific details of the trip means are not important and any other trip mechanism could be utilized. That illustrated forms the subject matter of the U. S. patent to Tuft 2,546,324.

Since the driving member is driven directly from the plunger crankshaft, the angular position of the hump 100 relative to the now released and temporarily stationary roller 116 on the clutch dog 98 will depend upon the position of the plunger. Theoretically, at least, the hump 100 should be in position to engage the roller 116 on the clutch dog 98 just as the plunger is traveling through the last few inches of its final compression stroke, so that the clutch 82—74 will be activated to bring the needles up through the plunger slots 72 and behind the final charge of hay. The two members 74 and 82, rotating now in unison, complete one revolution and draw the needle upwardly and then move it downwardly to its position of Fig. 1 before the plunger returns on its next compression stroke. Immediately after the trip arm 132 releases the clutch dog 98, the clutch dog swings so that the arm 108 is to the left or clockwise of the end of the trip arm 132. Thus, the clutch dog arm 108 is not immediately reengaged. However, the spring 134 on the trip arm 132 does return the trip arm to the position shown in Fig. 6, in which position it is ready to intercept the clutch dog arm 108 as the clutch completes the one revolution just referred to. Thus, the clutch, and considering the arm 132 part of the actuating means therefor, interrupts itself after one complete revolution.

It will be observed from the description thus far that the biasing means or spring 120 is the only means, other than the shape of the hump 100, that maintains engagement of the clutch dog roller 116 with the hump 100 on the driving ring 86. Hence, should something interfere with the engaged relationship between the driving and driven members and the clutch dog 98, such as to shift the clutch dog out of engagement with the driving member, the hump 100 would pass the roller 116 and the roller would again ride on the uninterrupted inner periphery of the ring 86. During this time, however, the plunger continues to operate and if the interruption of the clutch occurs at such time as to leave the needle 54 even partially within the bale case, the needle will be "baled" by the oncoming charged plunger. Accidental disengagement of the clutch in the general respect just noted may occur because of breakage or fatigue of the spring 120, or even by the engagement of the clutch dog arm 108 with accumulated hay, straw or other matter or objects that may have inadvertently accumulated in such position as to interfere with the travel of the engaged clutch dog arm 108. According to the present invention, this important difficulty is eliminated and safety control means is provided to block escape of the roller 116 from its position of engagement with the driving portion established by the driving ring hump 100.

In the preferred embodiment of the invention illustrated, the safety control means is designated generally by the numeral 152 and takes the form of means fixed to the support 32 in concentric relation to the driving and driven members and including a substantially circular track 154 over which the clutch dog guide element or outer roller 118 passes or travels when the clutch dog 98 is in its driving position. The circular track 154 is incomplete, being interrupted to provide a recess or pocket means 156 for accommodating the guide element or roller 118 when the clutch dog 98 is in its retracted or disengaged position, as best shown in Fig. 2.

As best illustrated in Fig. 4, the affixation of the safety control means 152 to the support 32 is effected by casting the track 154 integral with the control cam 46 for the needle lift arm roller 70; although, it will be understood that the invention may take other forms. As also shown in Fig. 4, the connection of the needle-lift arm 50 to the shaft 44 is effected by a removable pin 158 and the track 154 is apertured at 160 to permit removal of the pin 158. This is merely incidental to the specific form of the invention illustrated.

The operation and effect of the safety control means 154 will be readily understood by a comparison of Figs. 2, 5 and 6. As shown in Fig. 2, the pocket means 156 accommodates the roller 118 when the clutch dog 98 is in its disengaged position. Consequently, the clutch dog may occupy its conventional retracted position clear of the driving portion established by the driving ring hump 100. When the trip arm 132 is tripped to release the clutch dog 98 to its driving position as shown in Fig. 5, the roller 116, which is coaxial with the guide element or control roller 118, drops down into the path of the driving ring hump 100 and the clutch members are connected for rotation in unison, as shown in Fig. 6, in which figure the trip arm 132 is shown as having been returned automatically to its clutch-dog-engaging position. Upon the completion of one revolution of the clutch members 74 and 82 in unison, the trip arm 132 again engages the clutch dog arm 108 and retracts it from its hump-engaging position, the pocket means or recess 156 again accommodating the roller 118 on the clutch dog arm furcation 112.

As previously stated, it is a feature of the invention to design a safety control means that may be readily incorporated into the basic design of a self-interrupting clutch, particularly one that is used in a well known type of baler. The design may, of course, be utilized in other forms in connection with different types of self-interrupting clutches, all of which may be accomplished without departing from the spirit and scope of the invention.

The circular design of the safety control means 152 readily adapts itself to the travel of the clutch components in circular paths. For example, when the clutch dog 98 is in its driving position, the coaxial rollers 110 and 118 travel through a circular path and the circular track 154 is concentric with this circular path. Furthermore, the circular track, when embodied in the design of clutch illustrated, may be easily disposed radially intermediate the driven member hub 102 and the inner periphery of the driving member ring 86. Other specific advantages of the invention, as well as broader principles involved, will readily occur to those versed in the art.

What is claimed is:

1. A rotary clutch of the character described, comprising: a rotatable driving member adapted to be journaled on a support and including a driving ring portion having a circular inner periphery interrupted by a driving lug means thereon; a driven member journaled coaxially with and for rotation at times relative to the driving member and having a driven hub loosely encircled by the driving ring portion; a clutch dog pivotally connected to the hub on an axis parallel to the axis of rotation of the members and having a lug-engaging roller thereon, said dog being swingable radially outwardly from a retracted position in which the roller is clear of the driving lug means to a driving position in which the roller is engaged by said driving lug means; means biasing the clutch dog to its driving position for rotation of the two members and the dog in unison; a second roller carried by the clutch dog coaxial with the lug-engaging roller; and means adapted to be fixed to the support in concentric relation to the driving and driven members and including a substantially circular track over which the second roller passes when the clutch dog is in its driving position, said track including radially inwardly directed pocket means for accommodating the second roller when the clutch dog is swung to its retracted position.

2. A rotary clutch of the character described, comprising: a rotatable driving member adapted to be journaled on a support and including a driving ring portion having a circular inner periphery interrupted by a driving lug means thereon; a driven member journaled coaxially with and for rotation at times relative to the driving member and having a driven hub loosely encircled by the driving ring portion; a clutch dog connected to the hub for movement radially outwardly toward and radially inwardly from the driving ring portion, said clutch dog having opposite radial faces; a lug-engaging roller on one face of the clutch dog engageable with the driving lug means upon radial outward movement of the clutch dog and disengageable from the driving lug means upon radial inward movement of the clutch dog; means biasing the clutch dog to its radially outward position to engage the lug-engaging roller with the driving lug means for effecting rotation of the two members and the dog in unison; a second roller on the opposite face of the dog radially intermediate the hub and the driving ring portion and movable in a circular path as the dog rotates with the driving and driven members; and means adapted to be fixed to the support in concentric relation to the driving and driven members and including a substantially circular track in radial register with the second roller and over which the second roller passes when the clutch dog is in its radially outward position, said track including radially inwardly directed pocket means for accommodating the second roller when the clutch dog is moved radially inwardly to disengage the lug-engaging roller from the driving lug means.

References Cited in the file of this patent

UNITED STATES PATENTS

| | | |
|---|---|---|
| 600,328 | Amanns | Mar. 8, 1898 |
| 925,957 | Sharp | June 22, 1909 |
| 1,170,785 | Tedell | Feb. 8, 1916 |
| 2,512,754 | Tuft | June 27, 1950 |
| 2,546,324 | Tuft et al. | Mar. 27, 1951 |
| 2,620,724 | Berry | Dec. 9, 1952 |

FOREIGN PATENTS

| | | |
|---|---|---|
| 761,472 | France | Jan. 5, 1934 |